United States Patent [19]

Vanderkooi, Jr. et al.

[11] 4,357,268

[45] Nov. 2, 1982

[54] NUCLEATION AGENTS FOR CRYSTALLINE POLYMERS

[75] Inventors: Nicholas Vanderkooi, Jr., Pompton Plains; John C. Haylock, Sparta; Stephen R. Schulze, West Caldwell; Harold W. Tuller, Long Valley, all of N.J.

[73] Assignee: Allied Corporation, Morris Township, Morris County, N.J.

[21] Appl. No.: 220,878

[22] Filed: Dec. 29, 1980

[51] Int. Cl.³ .................. C08L 91/00; C08K 5/09; C08L 67/02
[52] U.S. Cl. .................................. 524/285; 524/605
[58] Field of Search .............. 260/22 D, 40 R, 22 EP; 525/4, 5

[56] References Cited

U.S. PATENT DOCUMENTS

| | | | |
|---|---|---|---|
| 3,435,093 | 3/1960 | Cope | 260/357 |
| 3,516,957 | 6/1970 | Gray, Jr. et al. | 260/22 R |
| 3,580,874 | 5/1971 | Nishimura | 260/22 D |
| 3,639,527 | 2/1972 | Brinkman et al. | 260/873 |
| 3,649,571 | 3/1972 | Keck | 260/22 D |
| 4,195,000 | 3/1980 | Charles | 260/40 R |
| 4,284,540 | 8/1981 | Iida et al. | 260/40 R |

FOREIGN PATENT DOCUMENTS

| | | |
|---|---|---|
| 54-32561 | 3/1979 | Japan . |
| 7901605 | 2/1978 | Netherlands . |
| 7901609 | 2/1979 | Netherlands . |
| 1315699 | 5/1973 | United Kingdom . |

OTHER PUBLICATIONS

U.S. Ser. No. 244,875 filed Mar. 18, 1981 requesting a priority date of Apr. 1, 1980; corresponding to Japanese Kokai 56–139550 (priority document noted as 01.04.80 JP 42250/80) and EPC Ser. No. 81301209.3 filed Mar. 20, 1981.

*Primary Examiner*—Paul Lieberman
*Assistant Examiner*—Robert E. L. Sellers
*Attorney, Agent, or Firm*—Richard A. Negin

[57] ABSTRACT

A polyethylene terephthalate composition comprising the salt of a dimer acid, trimer acid or the salt of a mixture of dimer and trimer acid. The dimer and/or trimer acids are neutralized with a Group IA metal cation, preferably sodium. The composition can contain a filler, plasticizer, impact modifier and/or a polyepoxide.

38 Claims, No Drawings

NUCLEATION AGENTS FOR CRYSTALLINE POLYMERS

DESCRIPTION

BACKGROUND OF THE INVENTION

1. Field of the Invention

This invention relates to nucleating agents made from neutralized dimer or trimer carboxylic acids for crystallizable polymers. Nucleating agents of this invention are particularly useful for the crystallization of saturated polyester, such as polyethylene terephthalate.

2. Description of the Prior Art

It is known to use nucleating agents in crystallizable polymers, such as linear saturated polyesters of aromatic dicarboxylic acids. U.S. Pat. Nos. 3,435,093, 3,516,957 and 3,639,527, as well as Dutch Pat. Nos. NL 79-01609 and NL 79-01605, disclose various approaches to molding thermoplastic compositions of linear saturated polyesters of aromatic dicarboxylic acids, and are particularly applicable to polyethylene terephthalate. These patents generally disclose the use of salts of hydrocarbon and polymeric carboxylic acids as nucleating agents for linear saturated polyesters. Great Britain Pat. No. 1,315,699 discloses the use of low molecular weight sodium, lithium or barium salts of mono- or polycarboxylic acids used with solid, inert inorganic substances.

A molding formulation based on a linear saturated polyester, such as polyethylene terephthalate, should result in molded product having good physical properties including flexural strength, modulus, tensile strength and impact properties. Further, the molding compound should also have good molding properties, including a melt flow index for sufficient flow into the mold, good mold release properties and good finished appearance.

From a practical point of view, it is desirable that satisfactory properties, as outlined above, be attained using water heated molds. That is, molds heated to temperatures between 76.7° C. (170° F.) to about 100° C. (212° F.). In order to accomplish this, it is desirable for crystallization to begin at as high a temperature as possible upon the cooling of the polyester which was fed into the mold, and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals appear upon heating an amorphous piece of polyester. $T_{cc}$ and $T_{ch}$ can be measured using a Differential Scanning Calorimeter.

SUMMARY OF THE INVENTION

This invention is a composition comprising polyethylene terephthalate, which contains up to about 10% by weight of the polyethylene terephthalate of the salt of a dimer acid, the salt of a trimer acid, or the salt of a mixture of a dimer acid and a trimer acid. The mixture has from 0 to 100 percent, and preferably 3 percent to 90 percent, by weight of the trimer acid. The dimer acid has at least 36 carbon atoms and two carboxyl groups, and the trimer acid has at least 54 carbon atoms and 3 carboxyl groups. The total amount of carboxyl groups are neutralized up to 100 percent by a cation of a metal selected from Group IA of the Periodic Table of the Elements. In a preferred embodiment, the cation is selected from the group consisting of potassium and sodium. Preferably, the composition contains up to about 15 percent based on the weight of the polyethylene terephthalate, of a plasticizer, and up to 10 percent of an impact modifier. The composition can be filled with up to about 150 percent filler, based on the weight of the polyethylene terephthalate.

A preferred embodiment comprises the polyethylene terephthalate, from about 0.2 percent to 2 percent of the sodium salt of a dimer acid, a trimer acid or a mixture thereof, and 2 percent to 6 percent of a plasticizer, such as neopentyl glycol dibenzoate. Preferably, there is from about 30 percent to 90 percent filler, such as glass fibers, and from 2 percent to 6 percent of an impact modifier, such as an ethylene acrylic acid copolymer. Percents are based on the weight of polyethylene terephthalate.

The present invention is a polyethylene terephthalate composition which can be molded in water heated molds. It contains both the noted nucleating agent and a plasticizer to widen the temperature spread between the $T_{cc}$ and $T_{ch}$. That is, the $T_{cc}$ is increased and the $T_{ch}$ is decreased, thereby allowing crystallization to occur over as wide a range as possible.

Objects, features and advantages of the present invention will become apparent by reference to the following specification:

DESCRIPTION OF THE PREFERRED EMBODIMENTS

This invention is a composition comprising a mixture of a linear saturated polyester, preferably polyethylene terephthalate, and up to about 10 percent based on the weight of the polyethylene terephthalate, of the salt of a dimer acid, the salt of a trimer acid, or a mixture of the salt of a dimer acid and the salt of a trimer acid. The mixture has from 0 percent to 100 percent, and preferably 3 percent to 90 percent, by weight of the polyethylene terephthalate, of trimer acid. The dimer acid has at least 36 carbon atoms and two carboxyl groups, and the trimer acid has at least 54 carbon atoms and 3 carboxyl groups. The carboxyl groups of the dimer acid or trimer acid are neutralized by a cation of a metal selected from Group IA of the Periodic Table of the Elements. Preferably, the composition contains a filler, such as fiberglass and suitable plasticizers known in the art of polyester molding compositions. There can be up to about 150 percent, and preferably from 30 percent to 90 percent, filler based on the weight of the polyethylene terephthalate. The preferred filler is fiberglass in the range of from 30 percent to 90 percent by weight, based on the weight of the polyethylene terephthalate.

The polyethylene terephthalate for use with the present invention has an intrinsic viscosity range between about 0.4 and about 1.00, with a preferred intrinsic viscosity range between about 0.45 and 0.75. Intrinsic viscosity is obtained by extrapolation of viscosity values to zero concentration of solutions of polyethylene terephthalate in a 60 to 40 volume ratio of phenol and tetrachloroethane. The measurements are normalized to 25° C. The polyethylene terephthalate can contain minor amounts, up to 5%, of other comonomers such as diethylene glycol or glutaric acid.

The nucleating agent of the composition of the present invention can be used with linear saturated polyesters of aromatic dicarboxylic acids with the preferred linear saturated polyester being polyethylene terephthalate. It is particularly preferred to be used with polyethylene terephthalate where it provides a molding composition which has a high enough $T_{cc}$ so that it can be molded using water heated molds in a temperature range as low as 76.7° C. (170° F.).

The definition of dimer acid is a high molecular weight dibasic acid, which is liquid (viscous), stable, resistant to high temperatures, and which combines and polymerizes with alcohols and polyols to make a variety of products, such as plasticizers, lube oils, and hydraulic fluids. It is produced by dimerization of unsaturated fatty acids at mid-molecule, and usually contains thirty-six carbons. Trimer acid, which contains three carboxylic groups and usually fifty-four carbons, is similar.

Dimer and trimer acids are commercially available from Emery Industries, Inc. of Cincinnati, Ohio, and from the Union Camp Corporation, Chemicals Division, P.O. Box 6170, Jacksonville, Fla. Commercially available dimer and trimer acids are generally mixtures of dimer and trimer acids. These mixtures can contain from traces up to 4 percent monobasic acid. The composition of the present invention can include salts of commercial dimer and trimer acids which contain from a trace up to 4 percent of monobasic acids. These amounts of monobasic acids are considered nominal and do not adversely affect the composition of the present invention.

Pure dimer acid which can be used is a 36 carbon chain, dibasic acid. Commercial dimer acids made by Emery Industries include Empol 1010 Dimer Acid containing 97 percent dibasic acid and 3 percent tribasic acid; Empol 1014 Dimer Acid containing 95 percent dibasic acid, 4 percent tribasic acid, and 1 percent monobasic acid; Empol 1016 Dimer Acid containing 87 percent dibasic acid, 13 percent tribasic acid, plus a trace of monobasic acid; Empol 1018 Dimer Acid containing 83 percent dibasic acid, 17 percent tribasic acid, and a trace of monobasic acid; Empol 1022 Dimer Acid containing 75 percent dibasic acid, 22 percent tribasic acid, and 3 percent monobasic acid; Empol 1024 Dimer Acid containing 75 percent dibasic acid, 25 percent tribasic acid, and a trace of monobasic acid; and Empol 1054 dimer acid containing 55 percent dibasic acid, 41 percent tribasic acid, and 4 percent monobasic acid. Commercial dimer acids made by Union Camp Corporation which can be used include: Unidyme 10 containing 97 percent dibasic acid, 3 percent tribasic acid, and a trace of monobasic acid; Unidyme 14 containing 95 percent dibasic acid, 5 percent tribasic acid, and 0.2 percent monobasic acid; Unidyme 16 containing 87 percent dibasic acid, 13 percent tribasic acid, and 0.5 percent monobasic acid; Unidyme 18 containing 83 percent dibasic acid, 17 percent tribasic acid, and 0.5 percent monobasic acid; Unidyme 22 containing 75 percent dibasic acid, 22 percent tribasic acid, and 2 percent monobasic acid; and Unidyme 24 containing 75 percent dibasic acid, 25 percent tribasic acid, and 0.5 percent monobasic acid.

Pure trimer acid which can be used is a 54 carbon chain, tribasic acid. Commercially available trimer acids which can be used include: Empol 1040 Trimer Acid containing 80 percent tribasic acid and 20 percent dibasic acid; Empol 1041 Trimer Acid containing 90 percent tribasic acid and 10 percent dibasic acid; and Unidyme 60 containing 60 percent tribasic acid and 40 percent dibasic acid. The variety of commercially available dimer acids and trimer acids which can be used indicates that any pure dimer acid can be used, or pure trimer acid can be used, or any mixture of dimer acid and from 0 percent to 100 percent trimer acid can be used. The preferred nucleating agent contains between about 10 percent dimer to about 97 percent dimer acid, and correspondingly, 90 percent trimer acid to about 3 percent trimer acid. The most preferred nucleating agent contains about 75 percent dimer acid and about 25 percent trimer acid. As noted above, there can be nominal amounts of monobasic acids, which occur in mixtures of dimer and trimer acids.

The dimer acid and/or trimer acid is neutralized with a cation of a metal from Group IA of the Periodic Table of Elements. Preferably, the cation is sodium or potassium. The most preferred cation is sodium. The neutralization can occur between any cation containing material which causes the carboxyl groups of the dimer and/or trimer acid to be neutralized. The cation containing materials are weak acids, such as carbonates, bicarbonates, hydroxides, alkyloxides, and acetates. Preferred sodium containing materials are carbonates, bicarbonates and hydroxides, with sodium hydroxide being most preferred.

The dimer salt, trimer salt or mixture of a dimer salt and a trimer salt can be neutralized up to 100 percent, preferably from 10 percent to 100 percent, and most preferably from about 50 percent to 100 percent.

The neutralized dimer acid, trimer acid, or mixture of dimer acid and trimer acid are considered to be the nucleating agent of the present invention. There is up to about 10 percent, based on the weight of the polyethylene terephthalate, of a dimer salt, a trimer salt, or a mixture of a dimer salt and a trimer salt. Preferably, there is between about 0.2 percent and two percent, based on the weight of the polyethylene terephthalate, of a dimer salt, a trimer salt or a mixture of a dimer salt and a trimer salt. Most preferably, there is between about 0.3 percent and 1.0 percent, based on the weight of the polyethylene terephthalate of a dimer salt, a trimer salt, or a mixture of a dimer salt and a trimer salt. There should be sufficient nucleating agent to allow the formation of crystals in the molten polyethylene terephthalate composition at a high enough temperature upon cooling from the melt to be molded in water-cooled molds.

The temperature at which crystal formation is first measurable is $T_{cc}$. The $T_{cc}$ is measured using a Differential Scanning Calorimeter. Between 5 and 10 milligrams of sample is prepared. The sample is made in the form of a compression molded film which is vacuum dried. The sample is placed in the Differential Scanning Calorimeter and heated to 280° C. where it is held for two minutes. The sample is cooled at 10° C. per minute. The $T_{cc}$ appears as a sharp peak in the cooling branch of the curve. The $T_{cc}$ is approximately 190° C. to 195° C. for polyethylene terephthalate having an intrinsic viscosity normalized to about 0.56. It is desirable for crystallization from the melt to begin at as high a temperature as possible without adversely affecting other properties. This allows crystal nucleation to begin earlier and for crystallization to take place over a greater temperature range. The $T_{cc}$ is preferably at least 210° C., and more preferably at least 220° C. The $T_{cc}$ has been increased to as high as 220° C. using the sodium salt of trimer and dimer acids.

Any suitable filler can be used. The fillers may optionally be treated with various coupling agents or adhesion promoters as is known to those skilled in the art.

Such fillers may be selected from a wide variety of minerals, metals, metal oxides, siliceous materials, metal salts, and materials thereof. Examples of fillers include alumina, aluminum hydrates, feldspar, asbestos, talc, calcium carbonates, clay, carbon black, quartz, novaculite and other forms of silica, kaolinite, bentonite, garnet, mica, saponite, bentonite, calcium oxide, calcium hydroxide, etc. The foregoing recited fillers are illustrative only and are not meant to limit the scope of the fillers that can be utilized in this invention. As noted above, the most preferred filler is glass fibers. There is up to 150 percent by weight of the polyethylene terephthalate of filler, and preferably 30 percent to 90 percent by weight of the polyethylene terephthalate of filler, preferably fiberglass.

It is very desirable to use a plasticizer in the composition of the present invention. The plasticizers which can be used with the composition of the present invention are of the type known in the art which can be used with linear saturated polyester molding compositions, preferably polyethylene terephthalate. A nonlimiting group of plasticizers which can be used is found in Dutch Patents Nos. NL 79-01605 and NL 79-01609. The plasticizers disclosed are organic esters. The organic esters can be the product of an aromatic carboxylic acid of 7 to 11 carbon atoms containing at least one carboxyl group per aromatic nucleus, and an alcohol selected from those of the formula $(HOCH_2)_xR'$ wherein x is 1, 2 or 3 and R' is a hydrocarbon radical of 2 to 15 carbon atoms (preferably 2 to 10 carbon atoms) or those of the formula $HO-(R''O)_yR'''$ wherein y is a cardinal number between 1 and 8, R'' is a hydrocarbon radical of 2 to 15 carbon atoms (preferably 2 to 8 carbon atoms) and R''' is —H or a hydrocarbon radical of 2 to 20 carbon atoms (preferably 2 to 12 carbon atoms). The plasticizer disclosed can also be the product of an aliphatic carboxylic acid of 1 to 20 carbon atoms containing 1 to 3 carboxyl groups, and an alcohol of the formula $HO(R''O)_yR'''$, wherein R'', R''' and y are defined above. Further, the plasticizers disclosed include the following:

organic ketones of the formula

organic sulfones of the formula RSOOR;
organic sulfoxides of the formula $R_2SO$;
organic nitriles of the formula RCN; and organic amides of the formula

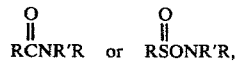

wherein R is a hydrocarbyl group of 1 to 25 carbons, and R' is a hydrogen or hydrocarbyl group of 1 to 25 carbon atoms.

A preferred aliphatic plasticizer is dioctyladipate, and a preferred aromatic plasticizer is neopentyl glycol dibenzoate. Other aromatic plasticizers which can be used include: triethylene glycol dibenzoate, glyceryl tribenzoate, trimethylolethane, tribenzoate and pentaerythritol tetrabenzoate. In the present invention, up to about 15 percent by weight of the polyester of a plasticizer can be used. Preferably, there is between about 2 percent and 10 percent, based on the weight of the polyethylene terephthalate, of plasticizer and most preferably there is between about 2 percent and about 6 percent, based on the weight of the polyethylene terephthalate, of plasticizer.

It has been found that the use of a plasticizer and the type of plasticizer affect the mold release properties and molded appearance of the molded polyethylene terephthalate article. $T_{ch}$ is the temperature at which crystals are first measured upon heating an amorphous piece of polyester. The use of a plasticizer reduces the $T_{ch}$. The $T_{ch}$ for pure polyethylene terephthalate is approximately 125° C. It is desirable to lower this value as much as possible for the best mold release and molded article release properties. The preferred polyethylene terephthalate composition should have as high a $T_{cc}$ as possible and as low a $T_{ch}$ as possible, allowing crystal formation and growth over the widest possible temperature range. The $T_{ch}$ is preferably not greater than about 110° C. It has been decreased to about 102° C. using 4 percent, based on the weight of the polyethylene terephthalate, of dioctyl adipate. Therefore, the temperature range over which crystallization can occur is from about 220° C. to about at least as low as 110° C. during cooling of the composition of the present invention. The range for pure polyethylene terephthalate is about 195° C. to 125° C.

Preferably, copolymers of ethylene and carboxylic acids or their esters can be used as impact modifiers. Included in these impact modifiers are the following copolymers: ethylene acrylic acid, methylene acrylic acid, ethylene ethyl acrylate, ethylene vinyl acetate, and mixtures thereof. There can be up to about 10 percent, and preferably between about 2 percent and about 6 percent, based on the weight of the polyethylene terephthalate, of the impact modifier.

The composition can contain up to about 3 percent, based on the weight of the polyethylene terephthalate, of a polyepoxide. The epoxy resin which can be used include an epoxy formed from bisphenol-A and glycidyl ether, or polyepoxides obtained by reacting orthocresol novolac and epichlorohydrin. Preferred polyepoxides are epoxy cresol novolac resins of the type produced by Ciba-Geigy Corporation, and include ECN TM 1234, 1273 and 1299. Preferably, there is from 0.1 percent to 0.5 percent, based on the weight of the polyethylene terephthalate, of polyepoxide. The polyepoxides act as chain extenders and help compensate for polyethylene terephthalate chains broken by hydrolysis.

Optionally, nucleating agents known in the art, such as inert nucleating agents, can be used in addition to the neutralized dimer and/or trimer acids. Talc is an example of a preferred inert neucleating agent.

In addition to the components discussed above, the compositions of the present invention can contain additives commonly employed with polyester resins, such as colorants, mold release agents, antioxidants, ultraviolet light stabilizers and the like.

A preferred filled composition comprises polyethylene terephthalate, from about 30 percent to 60 percent glass fibers, from about 3 percent to about 6 percent neopentyl glycol dibenzoate, from about 0.3 percent to 0.6 percent of the sodium salt of a dimer and trimer acid mixture, and from about 0.1 percent to about 0.5 percent of polyepoxide. There can be from about 2 percent to 4 percent ethylene acrylic acid. The percents are based on the weight of polyethylene terephthalate.

As indicated in the examples to follow, the use of a neutralized dimer acid and/or trimer acid results in a polyethylene terephthalate molding composition which can be injection molded into water heated molds at temperatures as low as 76.7° C. (170° F.). As the mold temperature increases, there is improvement in the molded article appearance. However, molded articles having satisfactory, although somewhat dull, appearance were made in a mold heated to 76.7° C. (170° F.). It is noted that the $T_{cc}$ in every case where the sodium neutralized dimer and/or trimer acid is used is high enough for satisfactory molding in a water heated mold.

The examples and composition set forth below illustrate the nature of the invention and the manner of carrying it out. However, the invention should not be considered as being limited to the details thereof. All parts are percent by weight unless otherwise indicated.

EXAMPLES 1-4

In Example 1-4, Empol 1041 Trimer Acid and Empol 1010 Dimer Acid are evaluated. The acids were 100 percent neutralized with sodium hydroxide. The compositions summarized below are blended with polyethylene terephthalate (PET) in a 1 inch extruder at about 287.8° C. (550° F.). The PET had a starting intrinsic viscosity of about 0.95. The $T_{cc}$ values normalized to an intrinsic viscosity (IV) of about 0.6 can be used for comparison. The intrinsic viscosity of the blended composition is noted. Additionally, Comparative 1 can be used for comparison with pure PET.

|  | Comp. 1 | Ex. 1 | Ex. 2 | Ex. 3 | Ex. 4 |
|---|---|---|---|---|---|
| PET | 100 | 99.5 | 99 | 95 | 99.5 |
| Trimer Salt (Na) | — | .5 | 1.0 | 5.0 | — |
| Dimer Salt (Na) | — | — | — | — | .5 |
| $T_{ch}$ (°C.) | 124 | 124 | — | 114 | 122 |
| $T_{cc}$ (°C.) | 195 | 210 | 219 | 224 | 210 |
| IV | .6 | .58 | .57 | .45 | .57 |
| $T_{cc}$ (.6 IV, °C.) | 195 | 209 | 217 | 216 | 208 |

These examples illustrate that the salt of Empol 1041, substantially a trimer salt, or the salt of Empol 1010, substantially a dimer salt can be used to significantly increase the temperature at which crystallization is first measurable upon the PET cooling from the melt.

EXAMPLES 5-6

Examples 5 and 6 and Comparatives 2 and 3 illustrate the effect of using unneutralized Empol 1010 Dimer Acid as compared to Empol 1010 Dimer Acid neutralized 100 percent with sodium hydroxide. The compositions were blended in the same manner as Examples 1-4. Comparative 1 can also be used with Examples 5 and 6. The PET had an initial intrinsic viscosity of 0.95. The intrinsic viscosity of the composition is noted. The $T_{cc}$ values are normalized to about 0.6 for comparison.

|  | Comp. 2 | Ex. 5 | Comp. 3 | Ex. 6 |
|---|---|---|---|---|
| PET | 99.0 | 99.0 | 94.3 | 94.3 |
| Dimer Acid | 1.0 | — | 5.7 | — |
| Dimer Salt (Na) | — | 1.0 | — | 5.7 |
| $T_{ch}$ (°C.) | 120 | — | 124 | 111 |
| $T_{cc}$ (°C.) | 210 | 217 | 210 | 220 |
| IV | .48 | .57 | .34 | .41 |
| $T_{cc}$ (.6 IV, °C.) | 203 | 215 | 196 | 210 |

These examples confirm Examples 1-4, in that the dimer salt increases the temperature at which crystallization is measurable. They further show that the neutralized acid more effectively increases $T_{ch}$ than the acid.

EXAMPLES 7-9

Examples 7-9 illustrate fiberglass filled polyethylene terephthalate compositions containing Dow 455 ethylene acrylic acid copolymer (EAA), polyepoxides formed by the reaction of orthocresol novolac with epichlorohydrin, and the dibenzoate ester of neopentyl glycol as a plasticizer. Empol 1010 is used as the dimer acid, Empol 1041 is used as the trimer acid, and Empol 1024 is used as a mixed dimer acid and trimer acid. All of the dimer acids and trimer acids are neutralized 100 percent with sodium hydroxide. Dow EAA 455 is manufactured by the Dow Chemical Corp. and has about 8 percent by weight acrylic acid. The fiberglass filler was Owens-Corning Corp. high strength glass fibers having an initial average length of less than ⅛ inch.

The molding properties and physical properties are reviewed. Molding was conducted at molds heated to 76.7° C. (170° F.) and 98.9° C. (210° F.). The molding release was rated as VG and E. VG is very good, indicating that molded articles occasionally stuck in the mold. The mold release was rated E, for excellent, indicating that molded articles always came out of the mold, and the mold could be run automatically. Appearance was rated as D and E. D is dull, but otherwise satisfactory. E is excellent appearance, indicating that the mold article had a very shiny and smooth surface. The intrinsic viscosity of the blended composition is noted.

|  | Ex. 7 | Ex. 8 | Ex. 9 |
|---|---|---|---|
| PET | 62.5 | 62.5 | 62.5 |
| Fiberglass | 30.0 | 30.0 | 30.0 |
| Neopentyl Glycol Dibenzoate | 4.0 | 4.0 | 4.0 |
| EAA | 2.75 | 2.75 | 2.75 |
| Epoxy | .3 | .3 | .3 |
| Dimer Salt (Na) | .45 | — | — |
| Trimer Salt (Na) | — | — | .45 |
| Mixed Salt (Na) | — | .45 | — |
| MOLDING: |  |  |  |
| 76.7° C. Mold Temp |  |  |  |
| Release | VG | VG | VG |
| Appearance | D | D | D |
| 98.9° C. Mold Temp |  |  |  |
| Release | E | E | E |
| Appearance | E | E | E |
| PHYSICAL PROPERTIES: |  |  |  |
| Tensile Str. psi (ASTM D-638) | 21,000 | 21,200 | 19,800 |
| Flexural Str. psi (ASTM D-790) | 31,100 | 32,000 | 30,600 |
| Unnotched Izod ft-lbs/in (ASTM D-256) | 15.3 | 15.0 | 12.2 |
| $T_{cc}$ °C. | 215 | 217 | 216 |
| IV | .54 | .54 | .54 |

These examples show that filled polyethylene terephthalate compositions can be molded in water heated molds with excellent mold release and molded appearance. Further, these molded compositions have satisfactory physical properties.

EXAMPLES 10-13

Examples 10-13 are a comparison of Empol 1054, which is a mixture of 55 percent dimer acid, 41 percent trimer acid, and 4 percent monobasic acids, with Empol 1010, which is 97 percent dimer acid and 3 percent trimer acid. The salts were neutralized 100 percent, with sodium hydroxide. The compositions contained Dow EAA 455, short glass fibers of the type in Examples 7-9, and epoxy cresol novolac resin (Ciba-Geigy ECN 1273). The compositions summarized below were blended in a 2½ inch NRM extruder at from 260° C. (500° F.) to 299° C. (570° F.). A mold release performance of VG, very good, indicates satisfactory mold release with the molded articles occasionally sticking in the mold. A mold release performance of G, good, indicates satisfactory mold release with the molded articles sticking in the mold more often than when the mold release is very good. The molding was conducted at a relatively low temperature of 79.4° C. (175° F.). The $T_{cc}$ was normalized to an intrinsic viscosity of 0.50. The intrinsic viscosity of the blended composition is noted.

|  | Ex. 10 | Ex. 11 | Ex. 12 | Ex. 13 |
|---|---|---|---|---|
| PET | 62.45 | 61.95 | 62.45 | 61.95 |
| Fiberglass | 30 | 30 | 30 | 30 |
| Neopentyl Glycol Dibenzoate | 4 | 4 | 4 | 4 |
| Dow EAA 455 | 2.75 | 2.75 | 2.75 | 2.75 |
| ECN 1273 (Epoxy) | .3 | .3 | .3 | .3 |
| Empol 1054 Salt (Na) | .5 | 1.0 | — | — |
| Empol 1010 Salt (Na) | — | — | .5 | 1.0 |
| Mold Release (175° F. Mold Temp) | G | VG | VG | VG |
| Flex. Str. psi (ASTM D-790) | 30,300 | 29,850 | 30,200 | 28,900 |
| Unnotched Izod ft-lb/inch (ASTM D-256) | 13.1 | 8.4 | 14.0 | 10.5 |
| $T_{cc}$ (.5 IV, °C.) | 213.5 | 214 | 213 | 214 |
| IV | .54 | .49 | .53 | .48 |

EXAMPLES 14, 15

Examples 14 and 15 are a comparison of filled PET compositions of the present invention with and without impact modifier. The PET used was a blend of PET having an intrinsic viscosity of 0.95 and PET having an intrinsic viscosity of 0.54, designed to result in a final composition with an intrinsic viscosity of about 0.54. The impact modifier is ethylene acrylic acid (EAA) and ethylene ethyl acrylate (EEA). The EAA is Dow EAA 455. The EEA is EEA 6169 manufactured by Union Carbide under the tradename Bakelite TM Flexible Ethylene Copolymer DPD-6169 described as having a melt index of 6 g/10 minutes and an ethyl acrylate content of 18 weight percent.

The plasticizer was neopentyl glycol dibenzoate, with dioctyl adipate used as a processing acid. The composition contained Empol 1024 dimer acid which was 100 percent neutralized with sodium hydroxide. A small amount of Talc 2610 from the Whittaker and Clark Corp. was used as an inert nucleating agent. The composition was filled with Owens-Corning Corp. high strength ⅛ inch glass fibers.

Comparative 3 contains no dimer acid salt. The compositions were blended in a 2½ inch NRM extruder at about 301.7° C. (575° F.). The samples of Examples 14–15 were molded at 79.4° C. (175° F.) and had excellent mold release. The samples of Comparative 3 were molded at 90.6° C. (195° F.), and stuck moderately in the mold and were more rubbery than the samples of Examples 14 and 15 upon release from the mold, even at the higher molding temperature. The intrinsic viscosity has been measured for the final composition. The compositions and results are summarized below.

|  | Ex. 14 | Ex. 15 | Comp. 3 |
|---|---|---|---|
| PET (.95 IV) | 38 | 38 | 29 |
| (.54 IV) | 22.5 | 26 | 31.5 |
| EAA | 2.8 | — | 2.8 |
| EEA | .6 | — | .6 |
| Epoxy | .38 | .38 | .38 |
| Dioctyl Adipate | .4 | .4 | .4 |
| Neopentyl Glycol Dibenzoate | 3.4 | 3.4 | 3.4 |
| Talc | .4 | .4 | .4 |
| Dimer Salt (Na) | .6 | .6 | — |
| Fiberglass | 30.0 | 30.0 | 30.0 |
| $T_{cc}$ (°C.) | 216 | 214 | 204 |
| IV | .54 | .56 | .55 |
| Tensile Str. psi (ASTM D638) | 18,700 | 20,900 | 18,700 |
| Flexural Str. psi (ASTM D-790) | 27,700 | 30,400 | 24,000 |
| Unnotched Izod (ASTM D-256) |  |  |  |
| As molded ft lbs/in. | 14.3 | 8.2 | 13.5 |
| Annealed @ 160° C. for 1 hour ft lbs/in. | 7.6 | 6.0 | 10.2 |

Example 14, compared to Example 15, shows that the addition of EAA and EEA results in better impact resistance. Examples 14 and 15, compared to Comparative 3, show the importance of the dimer sodium salt in attaining a higher $T_{cc}$.

EXAMPLES 16, 17

In Examples 16 and 17, Empol 1054 dimer acid was neutralized 100 percent with potassium hydroxide. The compositions summarized below were blended with 0.95 intrinsic viscosity polyethylene terephthalate in one inch extruder at about 287.8° C. (550° F.). The intrinsic viscosity of the blended composition is noted.

|  | Ex. 16 | Ex. 17 |
|---|---|---|
| PET | 99.5 | 99.0 |
| Dimer Salt (.95) | 0.5 | 1.0 |
| $T_{cc}$ (°C.) | 207 | 211 |
| IV | .57 | .59 |
| $T_{cc}$ (.6 IV, °C.) | 205 | 207 |

While exemplary embodiments of the invention have been described, the true scope of the invention is to be determined from the following claims.

What is claimed is:

1. A composition comprising:
   polyethylene terephthalate; and
   from about 0.2 percent to about 10 percent, based on the weight of the polyethylene terephthalate, of a nucleating agent comprising a dimer acid and trimer acid mixture, the mixture having from 0 percent to 100 percent by weight trimer acid, the dimer acid having at least 36 carbon atoms and two carboxyl groups, the trimer acid having at least 54 carbon atoms and three carboxyl groups, with the total amount of carboxyl groups being neutralized from 10 to 100 percent by a cation of a metal selected from Group IA of the Periodic Table of the Elements.

2. The composition as recited in claim 1, wherein the cation is selected from the group consisting of potassium and sodium.

3. The composition as recited in claim 2, wherein the cation is sodium.

4. The composition as recited in claim 3, wherein the sodium cation is supplied by a cation containing material selected from the group consisting of sodium bicarbonate, sodium carbonate and sodium hydroxide.

5. The composition as recited in claim 3, wherein the cation containing material is sodium hydroxide.

6. The composition as recited in claim 1, wherein the cation is supplied by a cation containing material selected from the group consisting of metal: carbonates, bicarbonates, hydroxides, alkyloxides and acetates.

7. The composition as recited in claim 6, wherein the cation containing material is selected from the group consisting of metal: carbonates, bicarbonates and hydroxides.

8. The composition as recited in claim 3, wherein the dimer acid has a 36 carbon chain with carboxyl groups at the chain ends.

9. The composition as recited in claim 3, wherein the trimer acid has 54 carbon atoms having at least three alkyl chains, with three alkyl chains ending in carboxyl groups.

10. The composition as recited in claims 1 or 3, wherein about 50 percent to 100 percent of the carboxyl groups of the dimer acid and trimer acid mixture are neutralized.

11. The composition as recited in claims 1 or 3, wherein there is from about 0.2 percent to 2 percent by weight of the polyethylene terephthalate of the dimer acid and trimer acid mixture.

12. The composition as recited in claim 11 wherein there is between about 0.3 percent and about 1 percent, based on the weight of the polyethylene terephthalate, of the dimer acid and trimer acid mixture.

13. The composition as recited in claims 1 or 3, further comprising up to 150 percent, based on the weight of the polyethylene terephthalate, of a filler.

14. The composition as recited in claim 13, wherein there is from about 30 percent to about 90 percent, based on the weight of the polyethylene terephthalate, of fiberglass filler.

15. The composition as recited in claims 1 or 3, further comprising up to 15 percent, based on the weight of the polyethylene terephthalate, of a plasticizer.

16. The composition as recited in claim 15, wherein there is between about 2 percent and about 10 percent, based on the weight of the polyethylene terephthalate, of the plasticizer.

17. The composition as recited in claim 16, wherein there is between about 2 percent and about 6 percent, based on the weight of the polyethylene terephthalate, of the plasticizer.

18. The composition as recited in claim 17, wherein the plasticizer is selected from the group consisting of: dioctyl adipate, neopentyl glycol dibenzoate, triethylene glycol dibenzoate, glyceryl tribenzoate, trimethylolethane, and pentaerythritol tetrabenzoate.

19. The composition as recited in claim 18, wherein the plasticizer is selected from the group consisting of dioctyl adipate and neopentyl glycol dibenzoate.

20. The composition as recited in claim 16, containing sufficient plasticizer for the composition to have a $T_{ch}$ of not greater than 110° C.

21. The composition as recited in claims 1 or 3, containing sufficient nucleating agent for the composition to have a $T_{cc}$ of at least about 210° C.

22. The composition as recited in claims 1 or 3, further comprising up to 10 percent, based on the weight of the polyethylene terephthalate, of an impact modifier.

23. The composition as recited in claim 22, wherein the impact modifier is selected from a group consisting of the following copolymers: ethylene acrylic acid, methylene acrylic acid, ethylene ethyl acrylate, and ethylene vinyl acetate.

24. The composition as recited in claim 23, containing between about 2 percent and about 6 percent based on the weight of the polyethylene terephthalate, of the impact modifier.

25. The composition as recited in claims 1 or 3, further comprising from 0.1 to about 3 percent, based on the weight of the polyethylene terephthalate, of epoxy.

26. The composition as recited in claims 1 or 3, wherein the dimer acid and trimer acid mixture contains from about 3 percent to about 90 percent by weight of trimer acid.

27. The composition as recited in claim 26, wherein the dimer acid and trimer acid mixture is about 75 percent by weight dimer acid and about 25 percent by weight trimer acid.

28. A composition comprising:
polyethylene terephthalate;
from about 0.2 percent to about 10 percent based on the weight of the polythethylene terephthalate, of a nucleating agent comprising a nucleating agent comprising a dimer acid and a trimer acid mixture, the mixture having from 0 percent to 100 percent trimer acid, the dimer acid having at least 36 carbon atoms and two carboxyl groups, the trimer acid having at least 54 carbon atoms and three carboxyl groups, with the total amount of carboxyl groups being neutralized from 10 to 100 percent by a cation of a metal selected from sodium and potassium;
up to 150 percent based on the weight of polyethylene terephthalate of a filler; and
up to 15 percent, based on the weight of the polyethylene terephthalate, of a plasticizer.

29. The composition as recited in claim 28, wherein there is between about 30 percent and about 90 percent, based on the weight of the polyethylene terephthalate, of filler.

30. The composition as recited in claim 29, wherein the filler is from 30 percent to 60 percent based on the weight of the polyethylene terephthalate, of glass fibers, and there is from 0.3 percent to 0.6 percent, based on the weight of the polyethylene terephthalate, of the sodium salt of a dimer acid and trimer acid mixture.

31. The composition as recited in claims 29 or 30, wherein there is between about 3 percent and about 6 percent by weight, based on the weight of the polyethylene terephthalate, of plasticizer.

32. The composition as recited in claim 31, wherein the plasticizer is selected from dioctyl adipate and neopentyl glycol dibenzoate.

33. The composition as recited in claim 31, further comprising between 2 percent and 6 percent, based on the weight of the polyethylene terephthalate, of an impact modifier.

34. The composition as recited in claim 31, wherein the impact modifier is selected from the group of ethylene ethyl acrylate copolymer, ethylene acrylic acid copolymer, and mixtures thereof.

35. The composition as recited in claim 31, further comprising 0.1 to 3 percent, based on the weight of the polyethylene terephthalate, of epoxy.

36. The composition as recited in claim 28, wherein the dimer and trimer mixture contains from about 3 percent to about 90 percent by weight dimer acid.

37. The composition as recited in claim 28, containing sufficient nucleating agent for the composition to have a $T_{cc}$ of at least about 210° C.

38. The composition as recited in claim 28, containing sufficient plasticizer for the composition to have a $T_{ch}$ of not greater than 110° C.

* * * * *

UNITED STATES PATENT AND TRADEMARK OFFICE
CERTIFICATE OF CORRECTION

PATENT NO. : 4,357,268
DATED : November 2, 1982
INVENTOR(S) : N. Vanderkooi, Jr., J. C. Haylock, S. R. Schulze, and H. W. Tuller It is certified that error appears in the above-identified patent and that said Letters Patent are hereby corrected as shown below:

Col. 12, lines 27, 28, "nucleating agent comprising a nucleating agent comprising a dimer acid and a trimer acid mixture, . . ."

should read:

--nucleating agent comprising a dimer acid and a trimer acid mixture, . . .--

Signed and Sealed this

Nineteenth Day of July 1983

[SEAL]

Attest:

GERALD J. MOSSINGHOFF

Attesting Officer   Commissioner of Patents and Trademarks